US012318891B1

(12) United States Patent
Cheng

(10) Patent No.: US 12,318,891 B1
(45) Date of Patent: Jun. 3, 2025

(54) PNEUMATIC TOOL

(71) Applicant: KUANI GEAR CO., LTD., New Taipei (TW)

(72) Inventor: Ming-Kun Cheng, New Taipei (TW)

(73) Assignee: KUANI GEAR CO., LTD, New Taipei (TW)

( * ) Notice: Subject to any disclaimer, the term of this patent is extended or adjusted under 35 U.S.C. 154(b) by 0 days.

(21) Appl. No.: 18/596,659

(22) Filed: Mar. 6, 2024

(51) Int. Cl.
*B25B 21/02* (2006.01)
*B25F 5/02* (2006.01)
*F01D 5/02* (2006.01)

(52) U.S. Cl.
CPC ................ *B25B 21/02* (2013.01); *B25F 5/02* (2013.01); *B25B 21/026* (2013.01); *F01D 5/021* (2013.01)

(58) Field of Classification Search
CPC ....... B25B 21/00; B25B 21/02; B25B 21/026; B25B 21/004; F01D 5/021; F01D 5/026; F01D 5/043; B25F 5/00; B25F 5/02
USPC ............... 173/93, 93.5, 93.6, 176, 109, 218; 81/464
See application file for complete search history.

(56) References Cited

U.S. PATENT DOCUMENTS 4,919,022 A * 4/1990 Ono ...................... B25B 21/004 81/464
4,967,852 A * 11/1990 Tatsuno .................. B25B 21/02 464/25
5,611,404 A * 3/1997 Biek ........................ B25B 21/02 173/1
5,622,230 A * 4/1997 Giardino ............... B25B 21/026 173/93.5
5,954,141 A * 9/1999 Li ......................... F01C 1/3442 173/93.5
6,059,049 A * 5/2000 Lin ........................... B25F 5/00 173/218
6,491,112 B1 * 12/2002 Shin ........................ B25B 21/02 173/171
6,880,645 B2 * 4/2005 Izumisawa ................ B25F 5/00 173/93.5
7,438,140 B2 * 10/2008 Sterling .................. B25B 21/02 173/104
7,527,486 B2 * 5/2009 Del Rio ........... A61B 17/32002 418/268
9,227,308 B2 * 1/2016 Wang .................... B25B 21/026
11,092,011 B2 * 8/2021 Huang .................... F01D 5/021
11,883,942 B2 * 1/2024 Bothmann .............. F01C 13/02
2003/0121679 A1 * 7/2003 Taga ....................... B25B 21/02 173/93.5

(Continued)

*Primary Examiner* — Scott A Smith
(74) *Attorney, Agent, or Firm* — Apex Juris, pllc; R. Lynette Wylie

(57) ABSTRACT

A pneumatic tool has a body and a drive module. The body has a cylinder chamber, two bearing recesses, and two bearings. The cylinder chamber is formed in the body. The two bearing recesses are respectively disposed at a front side wall and a rear side wall of the body. The two bearings are respectively disposed in the two bearing recesses. The drive module is connected to the body and has a cylinder, a rotor, and two wear-resistant sheets. The cylinder is disposed in the cylinder chamber. The rotor is rotatably disposed in the cylinder and has a rotating shaft. The two wear-resistant sheets are disposed in the cylinder chamber between the front side wall and the rear side wall of the body and the cylinder, and abut against the rotating shaft.

14 Claims, 7 Drawing Sheets

(56) References Cited

U.S. PATENT DOCUMENTS

2015/0202750 A1* 7/2015 Kobayashi ............ B25B 21/004
81/464

* cited by examiner

PNEUMATIC TOOL

BACKGROUND OF THE INVENTION

1. Field of the Invention

The present invention relates to a pneumatic tool, and more particularly to a pneumatic tool that can save costs, can improve structural strength, and can transmit stably.

2. Description of Related Art

A conventional pneumatic tool is driven by compressed air and has a body, a drive module, and an operating module. The body of the conventional pneumatic tool has multiple channels for the compressed air flowing. The drive module is disposed in the body and communicates with the channels of the body. The operating module is connected to the body to control a flowing direction of the compressed air in the channels of the body to allow the conventional pneumatic tool to fasten or loosen bolts or nuts.

In order to allow the compressed air to accurately drive the drive module and avoid the leakage problem of the compressed air, with reference to FIG. 7, a drive module of a conventional pneumatic tool 40 has a cylinder 41, a rotor 42, a front-end panel 43, and a rear-end panel 44. The rotor 42 is rotatably disposed in the cylinder 41. The front-end panel 43 and the rear-end panel 44 are disposed on a front side and a rear side of the cylinder 41 to seal the compressed air that flows into the cylinder 41, respectively. Then the compressed air flowing into the cylinder can drive the rotor 42 to rotate relative to the cylinder 41. Furthermore, in order to allow the rotor 42 of the drive module to rotate stably relative to the cylinder 41, the conventional pneumatic tool 40 has two bearing recesses 431, 441 respectively formed in the front-end panel 43 and the rear-end panel 44 and two bearings 45 respectively disposed in the two bearing recesses 431, 441. Then the rotor 42 can stably rotate relative to the cylinder 41 by connecting to the two bearings 45.

However, in order to prevent the compressed air flowing into the cylinder 41 from leaking, the conventional pneumatic tool 40 needs to process and manufacture the front-end panel 43 and the rear-end panel 44 respectively on the front side and the rear side of the cylinder 41, and this will increase the cost of manufacturing and also increase the time required for assembly. Furthermore, preventing the two bearings 45 from being displaced or detached from the front-end panel 43 and the rear-end panel 44, the two bearings 45 are respectively pressed into the front-end panel 43 and the rear-end panel 44 with a tight fit during assembly by means of compression deformation to achieve an effect of stable combination.

However, the structural strengths of the front-end panel 43 and the rear-end panel 44 respectively forming the two bearing recesses 431, 441 are insufficient, and the assembly method of tight fit will cause structural deformation of the front-end panel 43 and rear-end panel 44. The structural deformation of the front-end panel 43 and the rear-end panel 44 will easily come into contact with the rotor 42 and cause friction, and will produce wear and tear between the aforementioned components and also produce sound and noise between the aforementioned components that rub against each other, and this will affect the quality of the conventional pneumatic tool 40.

As mentioned above, when the drive module of the conventional pneumatic tool 40 is manufactured and assembled, the front-end panel 43 and the rear-end panel 44 need to be provided, which will not only increase the manufacturing cost but also increase the time required for assembly. Furthermore, the tight-fitting arrangement of the two bearings 45 will deform the front-end panel 43 and the rear-end panel 44 and affect the structural strengths of the front-end panel 43 and the rear-end panel 44. In addition, the structural deformation of the front-end panel 43 and rear-end panel 44 will also affect the rotation of the rotor 42 and produce wear and noise, etc. Therefore, the conventional pneumatic tool 40 needs to be improved.

The pneumatic tool in accordance with the present invention mitigates or obviates the aforementioned problems.

SUMMARY OF THE INVENTION

The main objective of the present invention is to provide a pneumatic tool that can save costs, can improve structural strength, and can transmit stably.

The pneumatic tool in accordance with the present invention has a body and a drive module. The body has a cylinder chamber, two bearing recesses, and two bearings. The cylinder chamber is formed in the body. The two bearing recesses are respectively disposed at a front side wall and a rear side wall of the body. The two bearings are respectively disposed in the two bearing recesses. The drive module is connected to the body and has a cylinder, a rotor, and two wear-resistant sheets. The cylinder is disposed in the cylinder chamber. The rotor is rotatably disposed in the cylinder and has a rotating shaft. The two wear-resistant sheets are disposed in the cylinder chamber between the front side wall and the rear side wall of the body and the cylinder, and abut against the rotating shaft.

Other objectives, advantages and novel features of the invention will become more apparent from the following detailed description when taken in conjunction with the accompanying drawings.

DETAILED DESCRIPTION OF THE PREFERRED EMBODIMENT

With reference to FIGS. 1 to 4, a pneumatic tool in accordance with the present invention has a body 10 and a drive module 20.

Figure 1:
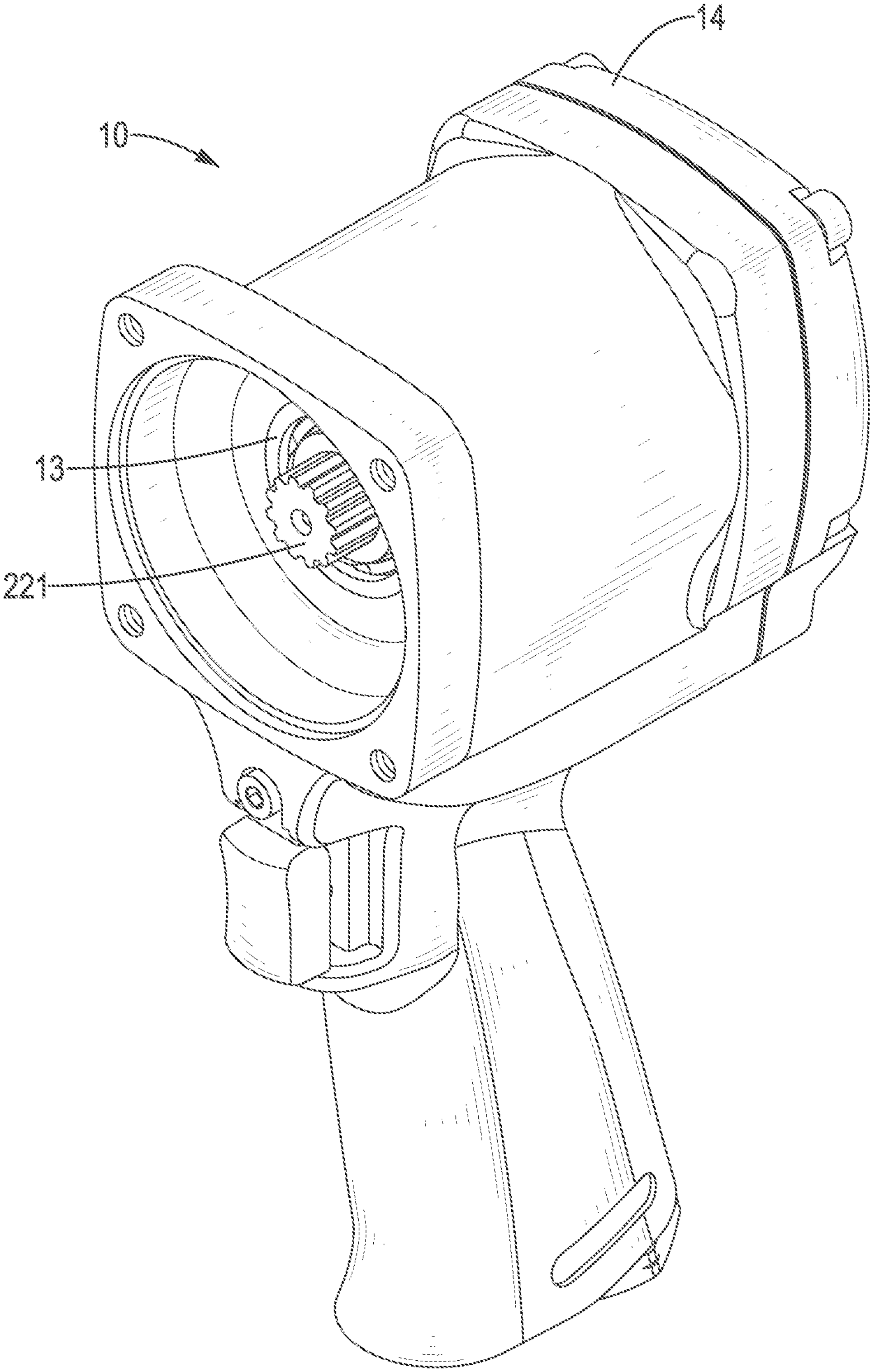
FIG. 1 is a top perspective view of a pneumatic tool in accordance with the present invention.
Figure 2:
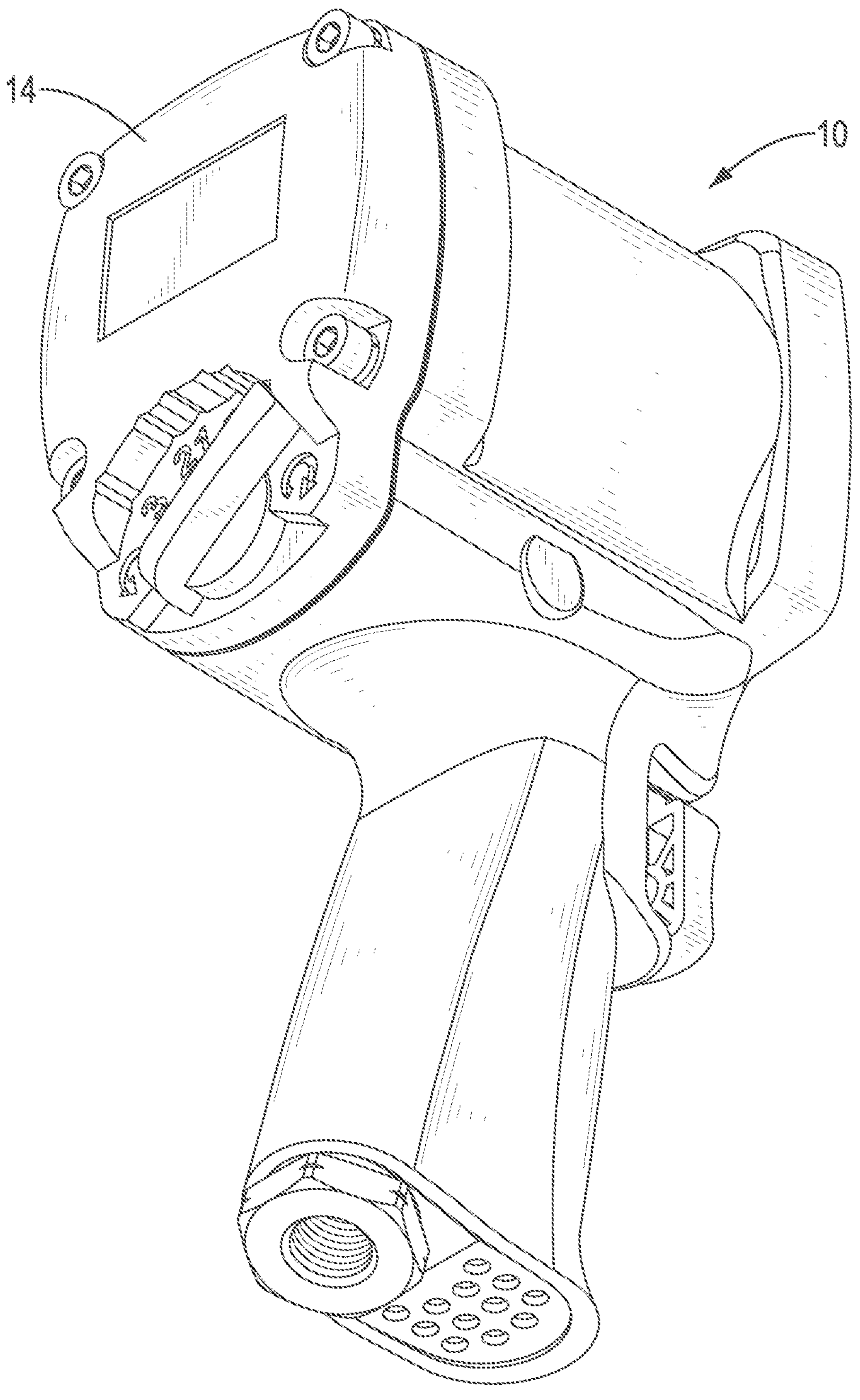
FIG. 2 is a bottom perspective view of the pneumatic tool in FIG. 1.
Figure 3:
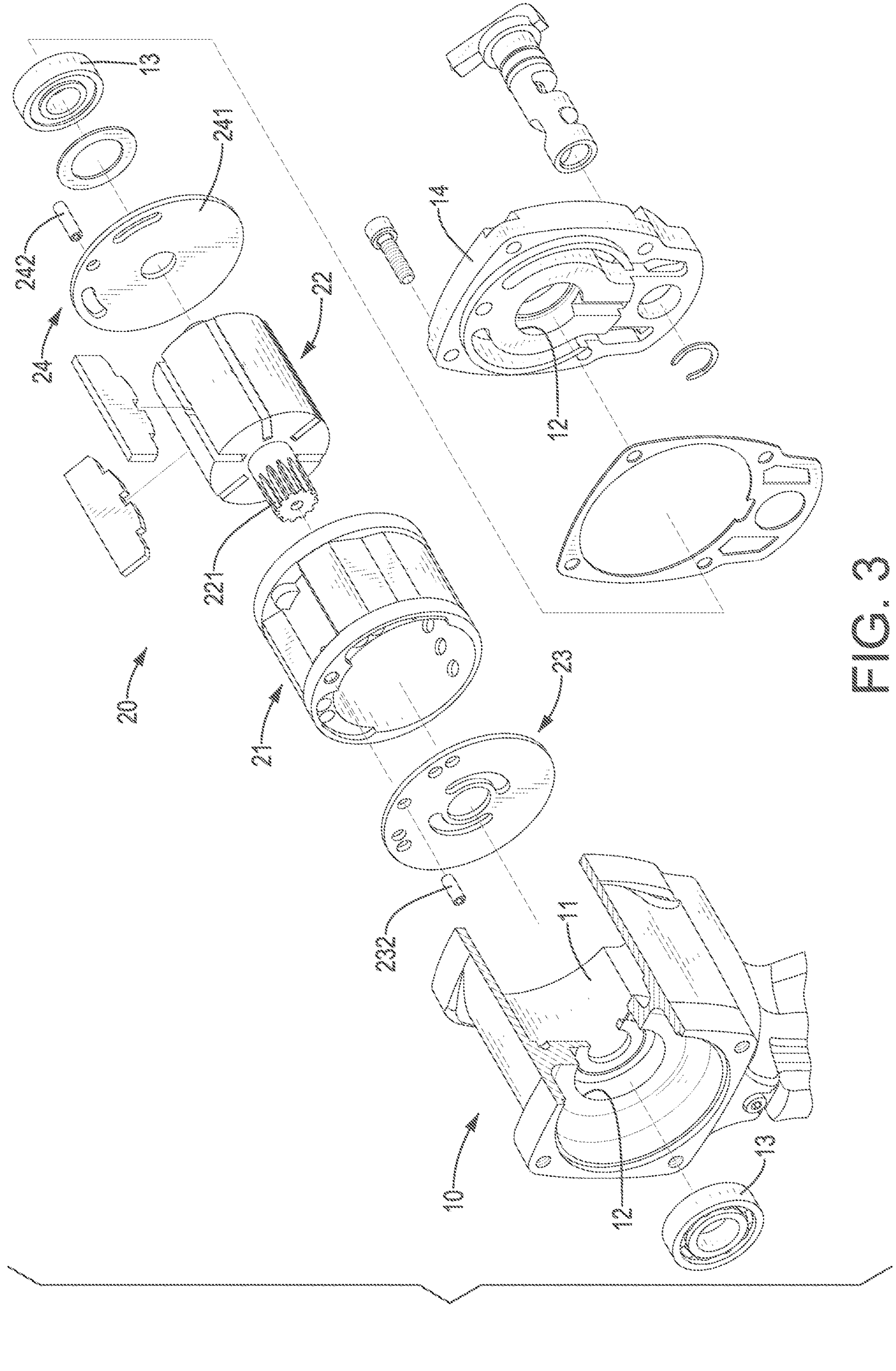
FIG. 3 is an exploded perspective view of the pneumatic tool in FIG. 1.
Figure 4:
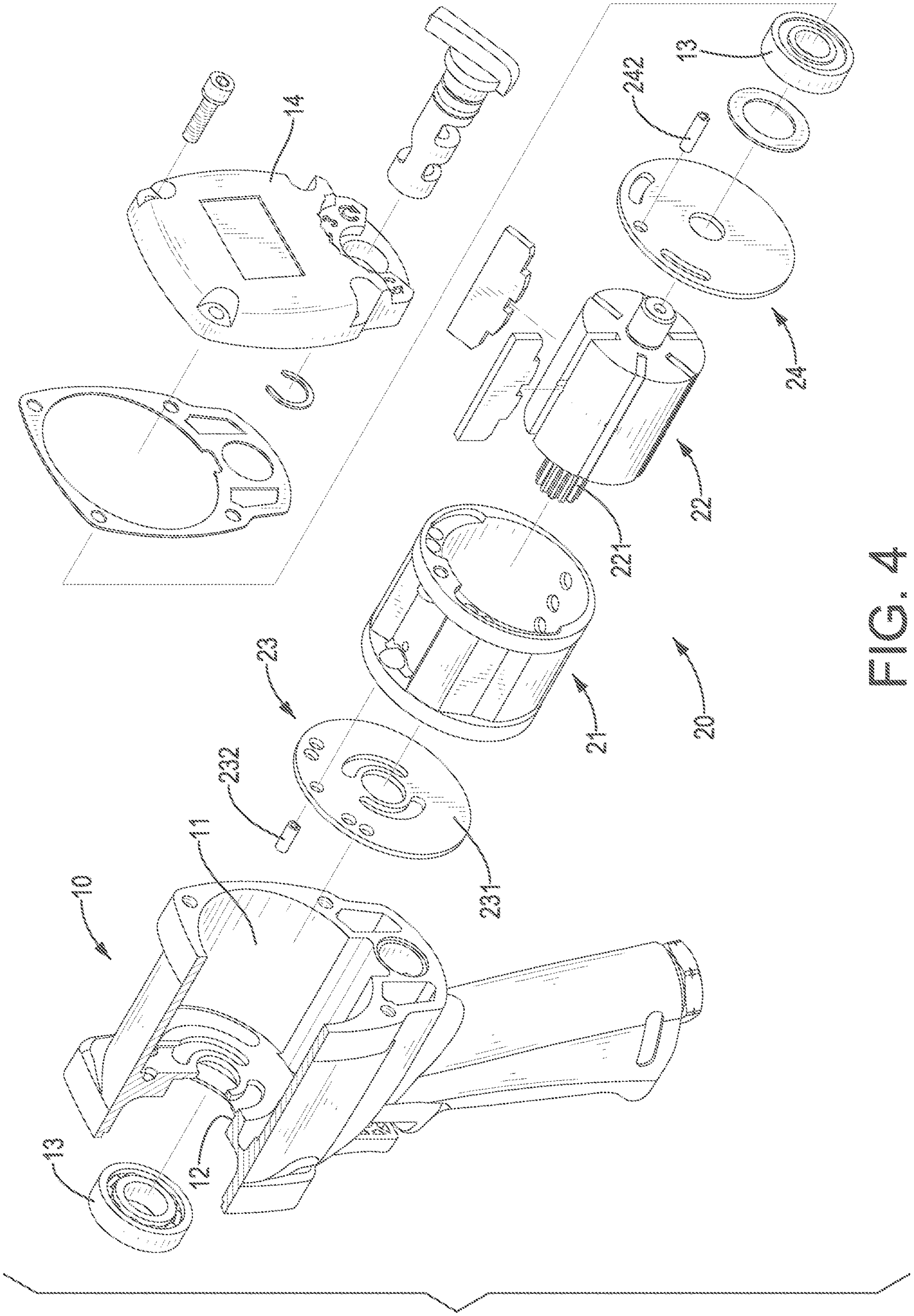
FIG. 4 is another exploded perspective view of the pneumatic tool in FIG. 1.
Figure 5:
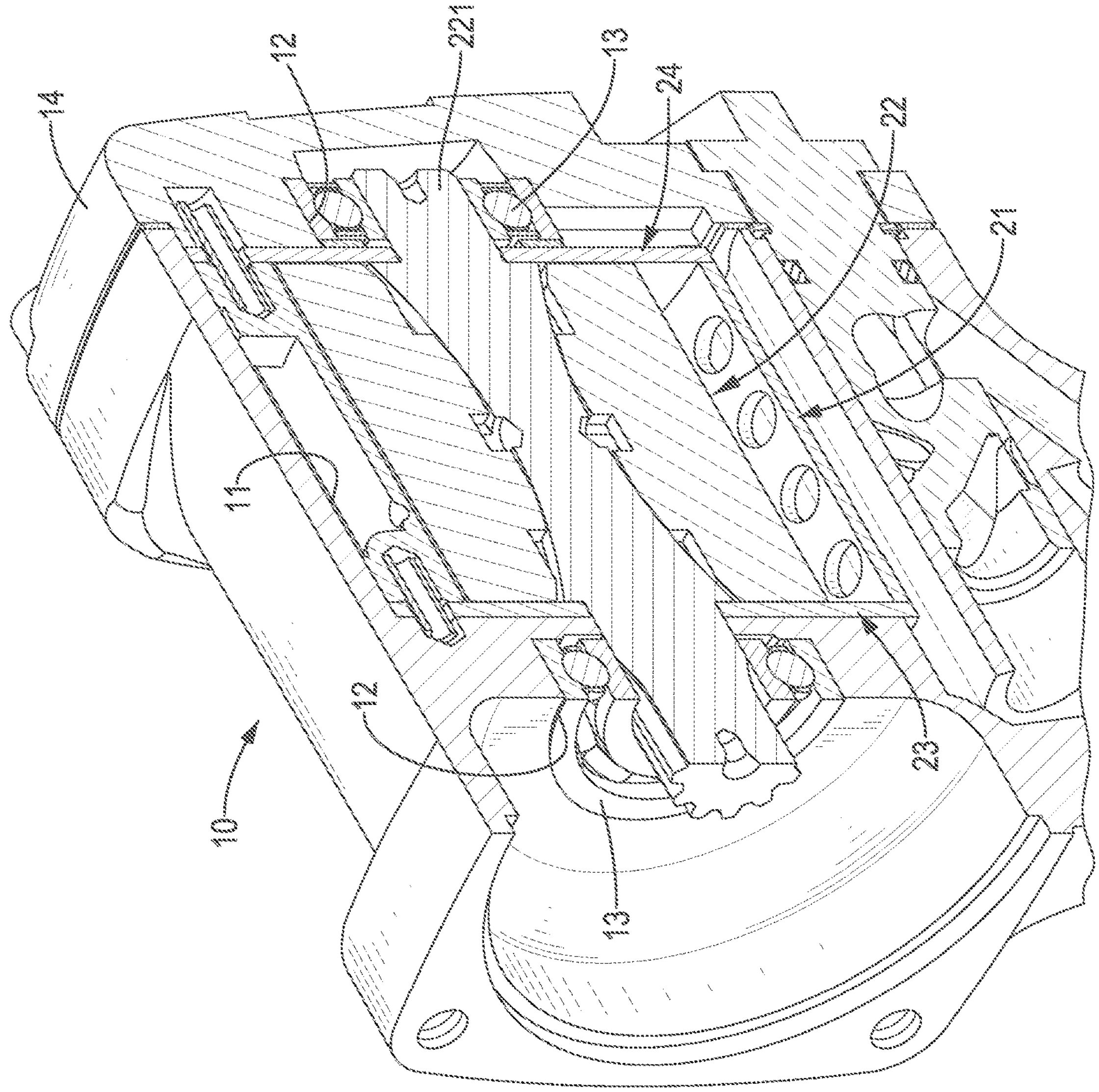
FIG. 5 is an enlarged cross sectional perspective view of the pneumatic tool in FIG. 1.
Figure 6:
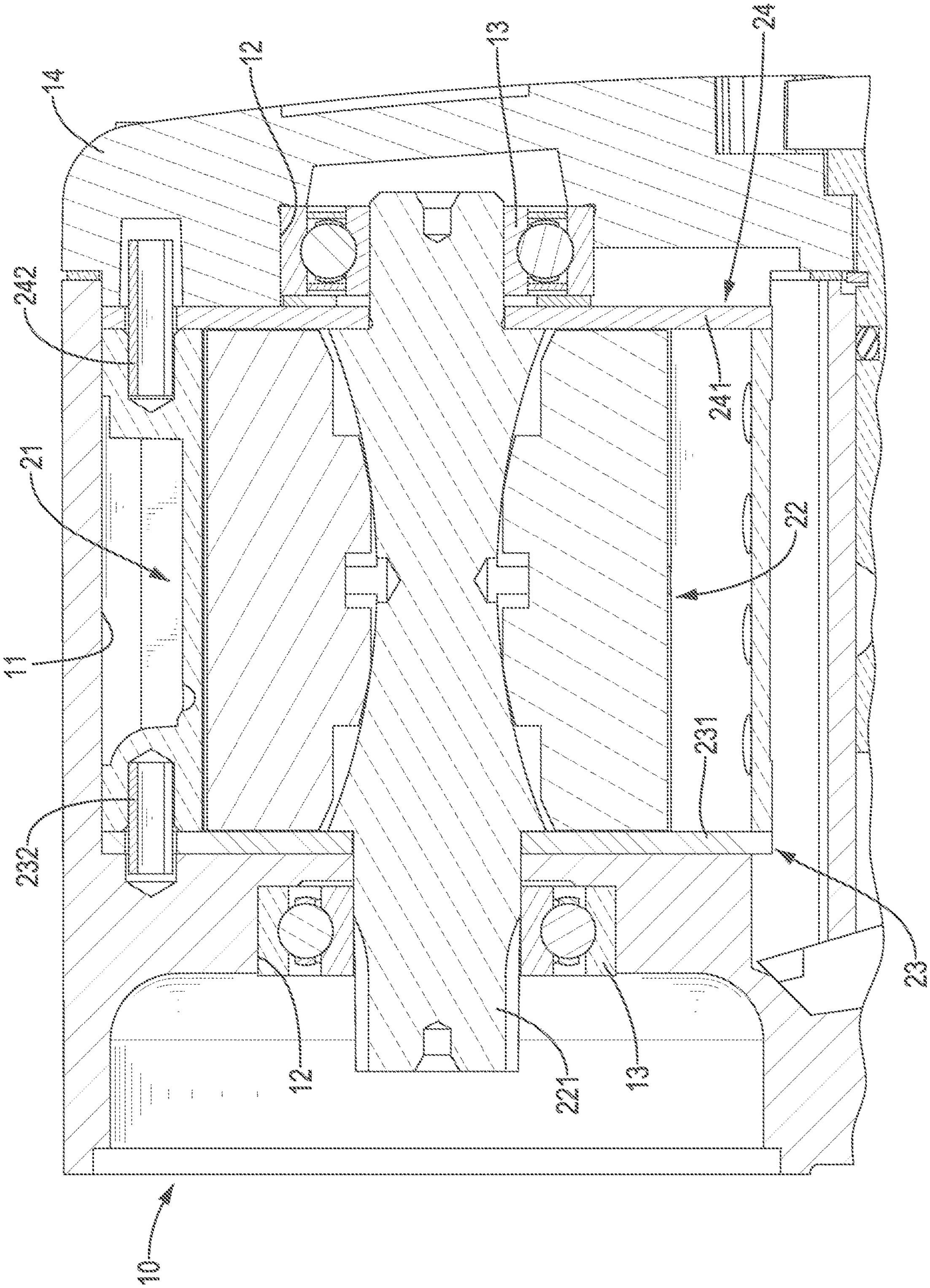
FIG. 6 is an enlarged cross sectional side view of the pneumatic tool in FIGS. 1.
Figure 7:
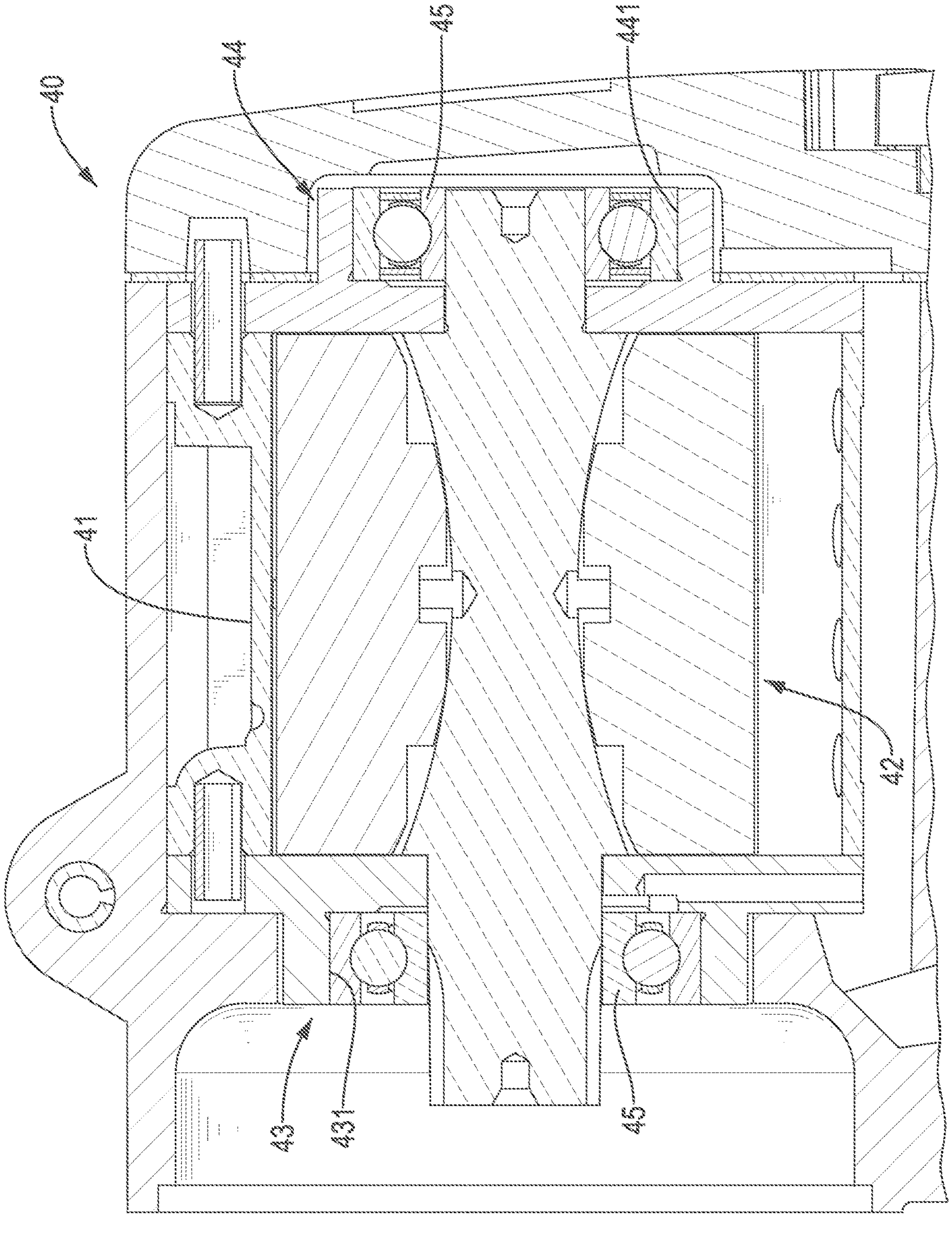
FIG. 7 PRIOR ART
FIG. 7 is a cross sectional side view of a pneumatic tool in accordance with the prior art.

With reference to FIGS. 3, 5, and 6, the body 10 has a cylinder chamber 11, two bearing recesses 12, and two bearings 13. The cylinder chamber 11 is transversally formed in the body 10. The two bearing recesses 12 are respectively disposed at a front side wall and a rear side wall of the body 10 and communicate with the cylinder chamber 11. Preferably, one of the two bearing recesses 12 is formed in the front side wall of the body 10, the other one of the two bearing recesses 12 is formed in a rear cover 14 of the body 10, and the rear cover 14 is disposed on the rear side wall of the body 10. The two bearings 13 are respectively disposed in the two bearing recesses 12.

With reference to FIGS. 3, 5, and 6, the drive module 20 is connected to the body 10 and has a cylinder 21, a rotor 22, and two wear-resistant sheets 23, 24. The cylinder 21 is disposed in the cylinder chamber 11 between the front side wall and the rear side wall of the body 10. The rotor 22 is rotatably disposed in the cylinder 21 and has a rotating shaft 221. The rotating shaft has a front end and a rear end, and the front end and the rear end of the rotating shaft 221 extend out of the cylinder 21 and are respectively connected to the two bearings 13 of the body 10. Then the rotor 22 can rotate relative to the cylinder 21 via the combination of the rotating shaft 221 and the two bearings 13. The two wear-resistant sheets 23, 24 are disposed in the cylinder chamber 11 between the front side wall and the rear side wall of the body 10 and the cylinder 21, and abut against the rotating shaft 221. That is, one of the two wear-resistant sheets 23, 24 is disposed between the front side wall of the body 10 and the cylinder 21, and the other one of the two wear-resistant sheets 23, 24 is disposed between the rear side wall of the body 10 and the cylinder 21 or the rear cover 14 of the body 10 and the cylinder 21.

In addition, each one of the two wear-resistant sheets 23, 24 has at least one wear-resistant surface 231, 241 abutted against the rotating shaft 221 of the rotor 22. Furthermore, each one of the two wear-resistant sheets 23, 24 has two said wear-resistant surfaces 231, 241 respectively formed on two opposite sides of the wear-resistant sheet 23, 24. Preferably, each one of the two wear-resistant sheets 23, 24 has a connecting pin 232, 242 connected to the cylinder 21 to position the two wear-resistant sheets 23, 24 between the body 10 and the cylinder 21.

With reference to FIGS. 5 and 6, when manufacturing the pneumatic tool of the present invention, it is only necessary to form the two bearing recesses 12 on the front side wall and the rear side wall of the body 10, respectively, without further manufacturing the front-end panel 43 and the rear-end panel 44 as the conventional pneumatic tool 40. Then time and cost required for manufacturing of the pneumatic tool of the present invention can be reduced, and time and manpower required for assembly of the pneumatic tool of the present invention can be reduced without assembling the front-end panel 43 and the rear-end panel 44. Additionally, since the two bearing recesses 12 are formed on the front side wall and the rear side wall of the body 10, when the two bearings 13 are respectively disposed in the two bearing recesses 12, the front side wall and the rear side wall of the body 10 with sufficient structural strengths will not be damaged due to tight fit to prevent structural deformation. Then the rotating shaft 221 of the rotor 22 will not contact the body 10 to rub against each other when rotating, and this can effectively mitigate the problems such as wear, sound, and noise that are caused by the structural deformation and mutual friction between the relevant components of the conventional pneumatic tool 40.

Furthermore, in assembly of the pneumatic tool of the present invention, the two wear-resistant sheets 23, 24 are disposed between the front and rear side walls of the body 10 and the cylinder 21, and this can prevent the body 10 from being worn by the rotation of the rotating shaft 221 and can allow the rotating shaft 221 to rotate stably, which improves the use quality of the pneumatic tool of the present invention. In addition, each one of the two wear-resistant sheets 23, 24 has two said wear-resistant surfaces 231, 241. When one of the wear-resistant surfaces 231, 241 of each one of the two wear-resistant sheets 23, 24 in contact with the rotating shaft 221 is used for a long time and worn, the wear-resistant sheet 23, 24 can be turned over to enable the other one of the two wear-resistant surfaces 231, 241 in contact with the rotating shaft 221 to use. Therefore, the present invention is relatively convenient to assemble and can effectively prolong the service life of the pneumatic tool, thereby achieving an effect of saving cost.

With the above-mentioned structural relationships and features of the present invention, when manufacturing the pneumatic tool of the present invention, only the two bearing recesses 12 are formed on the body 10, and the two bearings 13 can be conveniently and respectively disposed in the two bearing recesses 12. It is relatively convenient to manufacture and assemble the pneumatic tool of the present invention, can save time and cost, and the front side wall and the rear side wall of the body 10 will not be structurally deformed due to the assembly of the two bearings 13, and can effectively ensure the structural strength of the body 10 and prevent the rotating shaft of the rotor 22 contacting with and rubbing against the body 10 to avoid the problems of wear, sound, and noise. In addition, the two wear-resistant sheets 23, 24 disposed between the front side wall and rear side wall of the body 10 and the cylinder 21 can effectively ensure that the rotation of the rotating shaft 221 can stably transmit power and the service life of the pneumatic tool can be prolonged.

Even though numerous characteristics and advantages of the present invention have been set forth in the foregoing description, together with details of the structure and features of the utility model, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A pneumatic tool comprising:
- a body having
  - a cylinder chamber formed in the body;
  - two bearing recesses respectively disposed at a front side wall and a rear side wall of the body and communicating with the cylinder chamber; and
  - two bearings respectively disposed in the two bearing recesses; and
- a drive module connected to the body and having
  - a cylinder disposed in the cylinder chamber between the front side wall and the rear side wall of the body;
  - a rotor rotatably disposed in the cylinder and having
    - a rotating shaft having a front end and a rear end extending out of the cylinder and respectively connected to the two bearings of the body; and
  - two wear-resistant sheets disposed in the cylinder chamber, one of the two wear-resistant sheets disposed between the front side wall of the body and the cylinder, the other one of the two wear-resistant sheets disposed between the rear side wall of the body and the cylinder, and abutting against the rotating shaft.

2. The pneumatic tool as claimed in claim 1, wherein each one of the two wear-resistant sheets has at least one wear-resistant surface abutted against the rotating shaft of the rotor.

3. The pneumatic tool as claimed in claim 2, wherein each one of the two wear-resistant sheets has two said wear-resistant surfaces respectively formed on two opposite sides of the wear-resistant sheet.

4. The pneumatic tool as claimed in claim 3, wherein each one of the two wear-resistant sheets has a connecting pin connected to the cylinder to position the two wear-resistant sheets between the body and the cylinder.

5. The pneumatic tool as claimed in claim 4, wherein one of the two bearing recesses is formed in the front side wall of the body, the other one of the two bearing recesses is formed in a rear cover of the body, and the rear cover is disposed on the rear side wall of the body.

6. The pneumatic tool as claimed in claim 3, wherein one of the two bearing recesses is formed in the front side wall of the body, the other one of the two bearing recesses is formed in a rear cover of the body, and the rear cover is disposed on the rear side wall of the body.

7. The pneumatic tool as claimed in claim 2, wherein each one of the two wear-resistant sheets has a connecting pin connected to the cylinder to position the two wear-resistant sheets between the body and the cylinder.

8. The pneumatic tool as claimed in claim 2, wherein one of the two bearing recesses is formed in the front side wall of the body, the other one of the two bearing recesses is formed in a rear cover of the body, and the rear cover is disposed on the rear side wall of the body.

9. The pneumatic tool as claimed in claim 1, wherein each one of the two wear-resistant sheets has two wear-resistant surfaces respectively formed on two opposite sides of the wear-resistant sheet.

10. The pneumatic tool as claimed in claim 9, wherein each one of the two wear-resistant sheets has a connecting pin connected to the cylinder to position the two wear-resistant sheets between the body and the cylinder.

11. The pneumatic tool as claimed in claim 10, wherein one of the two bearing recesses is formed in the front side wall of the body, the other one of the two bearing recesses is formed in a rear cover of the body, and the rear cover is disposed on the rear side wall of the body.

12. The pneumatic tool as claimed in claim 9, wherein one of the two bearing recesses is formed in the front side wall of the body, the other one of the two bearing recesses is formed in a rear cover of the body, and the rear cover is disposed on the rear side wall of the body.

13. The pneumatic tool as claimed in claim 1, wherein each one of the two wear-resistant sheets has a connecting pin connected to the cylinder to position the two wear-resistant sheets between the body and the cylinder.

14. The pneumatic tool as claimed in claim 1, wherein one of the two bearing recesses is formed in the front side wall of the body, the other one of the two bearing recesses is formed in a rear cover of the body, and the rear cover is disposed on the rear side wall of the body.

* * * * *